Dec. 6, 1966  J. OSTLER  3,289,538
DUPLICATING MILLING MACHINE
Filed May 18, 1965  2 Sheets-Sheet 1

INVENTOR
JOSEF OSTLER
BY Brady, O'Boyle & Gates
ATTORNEYS

INVENTOR
JOSEF OSTLER
BY Brady, O'Boyle & Gates
ATTORNEYS

United States Patent Office 3,289,538
Patented Dec. 6, 1966

3,289,538
DUPLICATING MILLING MACHINE
Josef Ostler, Munich, Germany, assignor to Hans Deckel, Munich, Germany, and Friedrich Wilhelm Deckel, Zug, Switzerland
Filed May 18, 1965, Ser. No. 456,725
Claims priority, application Germany, May 26, 1964, D 44,535
4 Claims. (Cl. 90—13.1)

This invention relates to a duplicating milling machine with a hand operated cutting tool and tracer holder guided parallel to itself and freely movable in three coordinate directions, and more particularly to such a machine in which the working range of the parallel mechanism carrying the tool and tracer is transversely shiftable in steps across the width of the underlying model table and work table.

In a duplicating milling machine of the type generally described, the parallel mechanism carrying the tool and tracer is movable in three coordinates by a pantograph, well known in the art, which is operated by hand and transmits the movements of the hand on a reduced scale to the tool and tracer holder of the parallel mechanism and correspondingly increases the shifting forces exerted by the hand on the pantograph handle. The range in which controlled movements can be accurately carried out with force being exerted by the hand and arm is limited physiologically. This is particularly true for movements of the tool with the pantograph in transverse direction since this requires bending and stretching of the arm, which results in reduction of accuracy of the work when the operator is required to operate the pantograph and exert force thereon over a relatively great transverse range.

It is therefore an object of the present invention to provide a construction of duplicating milling machine with a tool holder or slide having a limited range of movement in the transverse direction to relieve arm tensions in the operation and produce more accurate work.

By limiting the transverse range of movement of the tool slide and parallel guiding mechanism the stability of the mechanism and machine is increased, enabling the production of more accurate work. However, this arrangement makes the machine unsuitable for larger workpieces.

It is thus another object of the present invention to provide a duplicating milling machine having greater stability than prior art machines of this general type.

To overcome the problem of the limited transverse movement of the tool making the machine unsuitable for larger workpieces, the invention consists in arranging the tool and tracer slide and the parallel guiding mechanism with its guides and counterbalance device, and the pivot support of the pantograph, when it is used, on a part of the milling machine that can be moved in horizontal transverse direction relative to the tables and the model and workpiece thereon. By shifting this part of the milling machine, the limited transverse working range of the tool holder or slide may be selectively shifted in steps over the width of the model and workpiece on the tables therebeneath, and the total working range of the machine in the transverse direction is thus increased to accommodate larger workpieces. With this arrangement the range of motion of the tool holder or slide, movable freely in three coordinates, is substantially reduced in the transverse direction, which gives the added advantage of reduction in structural parts and in weight of the structural parts which are moved by hand and which must be compensated for by a counterbalance device, to permit more accurate guidance of the tool holder mechanism by hand.

Another object of the invention is to provide a construction of duplicating milling machine with a tool holder movable freely in three coordinates, and having only a small range of motion in the transverse direction, which transverse range of motion is selectively shiftable transversely of the tables.

A further object of the invention is to provide a duplicating milling machine having less weight in the structural parts which are moved by hand, and a less bulky compensating or counterbalance device thus providing a machine having more accurate hand guidance of the tool holder and parallel guidance mechanism.

Other and further objects of the invention reside in the structural connection of the pantograph and parallel guidance mechanism, to a machine portion and a compensating tube which are connected to the same machine part which is shiftable transversely of the table, and other objects will become apparent, to those skilled in the art, from the specification hereinafter following by reference to the accompanying drawings, in which.

Figure 1:
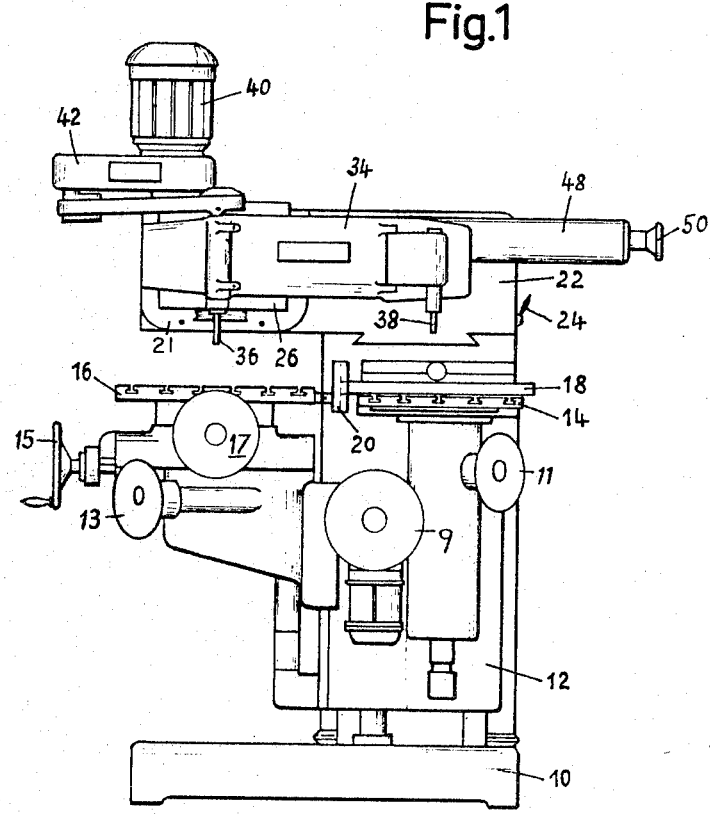
FIG. 1 is a front elevational view of the duplicating milling machine of the invention with the pantograph removed therefrom.
Figure 3:
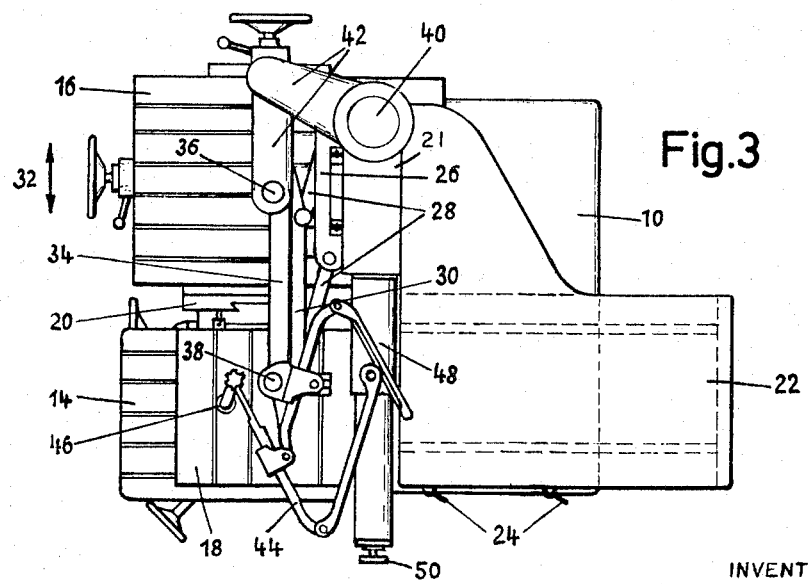
FIG. 3 is a top plan view of the machine of FIG. 2, particularly showing the manner in which the parallel guiding mechanism and pantograph are connected to the same transversely shiftable machine part.

Referring to the drawings in greater detail—a bracket 12 is connected for vertical movement on machine column 10, and is provided with vertical guides on two sides thereof for engaging a model table 14 and workpiece clamping table 16 which are independently vertically movable on the guides. A clamping device 18, for clamping model thereon, is disposed in overlying relation on model table 14 and is connected with clamping table 16 through coupling device 20 in such a manner that movement of workpiece table 16 in the two horizontal coordinates by handwheels 15 and 17 results in similar horizontal movements of clamping device 18. Coupling device 20, however, is provided with a vertical guide as indicated in FIGS. 1 and 3, whereby clamping device 18 is independent of movement of workpiece clamping table 16 in the vertical direction. Clamping table 16 may be vertically moved by handwheel 13 while model table 14 is vertically movable by manipulation of handwheel 11. Bracket 12, and therefore both tables 14 and 16 together, are vertically movable on machine column 10 by operation of handwheel 9. Since the mechanisms for operating bracket 12 and tables 14 and 16, by the mentioned handwheels, are well known in the art, it is deemed unnecessary to disclose the same or to further describe the operation of the same herein.

A machine head body portion 22 is connected for displacement on horizontal guides on the top of machine column 10. The machine head body portion is selectively movable along the horizontal guides in a direction transverse of tables 14 and 16 and can be locked in selected position on the guides by means of locking toggles 24. A portion of machine head body portion 22 extends over the side of machine column 10, in cantilever fashion, behind workpiece clamping table 16 and is provided with a machine portion 21 connected on its front face, which in turn carries vertical guides on its front face on which vertical slide 26 is vertically movable. A beam 30 is articulated on vertical slide 26 by means of a pair of guide arms 28 pivotally connected at opposite ends therebetween to form a parallel guiding mechanism of the type well known in the art. A tool holder or slide 34 is connected for horizontal displacement along beam 30 in the direction indicated by arrow 32, in the usual manner, with slide 34 carrying a working tool spindle 36 adjacent one end thereof and a feeler or tracer 38 adjacent the opposite end thereof. Tool spindle 36 is driven by motor 40 mounted on machine portion 21, through the movable angle belt drive linkage 42. It is to be noted that the guiding arms 28 are relatively short, such that while slide 34 is guided parallel to itself, and is freely movable in three coordinates its range of movement in the transverse direction is limited for the reasons previously set forth.

Figure 2:
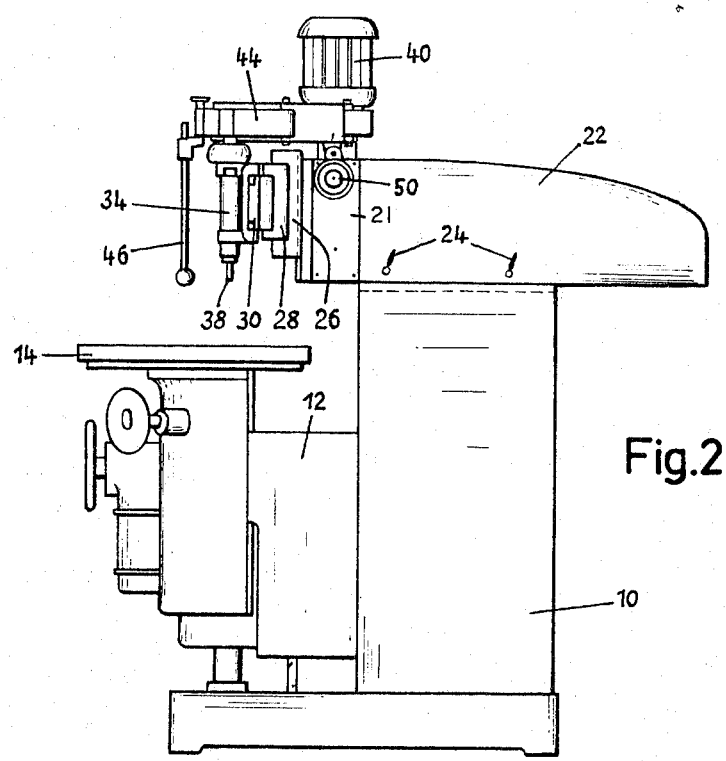
FIG. 2 is a side elevational view of the machine of FIG. 1, showing a pantograph connected thereon.

A pantograph 44 of the usual type, well known in the art, shown in FIGS. 2 and 3, is pivotally connected in the usual manner to slide 34 adjacent the tracer, and is pivotally connected on a tube 48 which is secured on machine portion 21, which in turn is connected to machine head body portion 22, and extends longitudinally of the tables, as shown, in axial alignment with machine portion 21 and in spaced adjacent relation with machine head portion 22. The pantograph is provided with a handle 46 and is operated in the usual manner, whereby movement of the handle by the operator's hand results in movement of slide 34 and thus the tool spindle and tracer in three coordinates. Tube 48 contains a compensating device, of the type known in the art, which is adjustable by handwheel 50 on the free end thereof, to compensate or counterbalance the vertically displaceable masses of the parallel mechanism, that is, vertical slide 26, guide means 28, beam 30, and tool slide 34. The compensating device consists of a tensioned spring, not shown, located within tube 48, which may be tensioned more or less by rotation of handwheel 50 to compensate the weight of parts 26 to 38.

A workpiece is clamped on table 16 and a model is clamped on clamping device 18. The tool 36 and tracer 38 are respectively guided over the workpiece and the model (not shown) by manipulation of handle 46 of the pantograph by hand. As previously indicated the free range of motion of slide 34 in the direction transverse of the tables is relatively small. In operation, to permit duplication of models of larger dimensions than would normally be possible with the limited transverse working range of slide 34, the range of motion of slide 34 is selectively shifted in steps over the width of tables 14 and 16 by shifting machine head body portion 22 in its horizontal guide by a desired amount after disengaging locking toggles 24. After the head is shifted to a new transverse position over the tables, toggles 24 are locked and the working range of the parallel guiding mechanism or parallelogram mechanism in the transverse direction is now positioned to operate over a new increment of the width of the working table and model table.

While the invention has been shown and described in a certain preferred embodiment it is realized that modifications may be made without departing from the scope of the invention and it is to be understood that no limitations upon the invention are intended other than those imposed by the scope of the appended claims.

What I claim as new and desire to secure by Letters Patent of the United States, is as follows:

1. A duplicating machine comprising a machine column, table means for work and model connected for movement relative to said machine column, machine head means shiftably connected to the top of said machine column and being selectively shiftable transverse of said table means, a machine portion connected to said machine head means above said table means, an arm portion connected at one end to said machine portion and extending longitudinally of said table means and transverse of the path of movement of said machine head means and having a free opposite end, a parallelogram mechanism carrying working tool means and tracer means connected to said machine portion above said table means for movement in three coordinates, a pantograph connected to said parallelogram mechanism and to said arm portion intermediate the ends thereof, and counterbalance means connected in said arm portion and connected to said parallelogram mechanism to counterbalance the weight thereof, whereby the relatively small working range of said parallelogram mechanism in the transverse direction is selectively shiftable transverse of said table means.

2. A duplicating machine as set forth in claim 1 in which said arm portion comprises a tubular member disposed in spaced relation with said machine head means.

3. A duplicating machine as set forth in claim 1 in which said machine portion includes means connected for driving said working tool means, and said arm portion extending a substantial distance outwardly of said machine portion.

4. A duplicating machine as set forth in claim 1 in which said arm portion comprises a tubular member disposed substantially parallel with said parallelogram mechanism and in axial alignment with said machine portion, and the connection between said tubular member and said machine portion spaced longitudinally of said table means from the connection between said parallelogram mechanism and said machine portion.

References Cited by the Examiner
UNITED STATES PATENTS 3,085,477   4/1963   Zwick _____ 90—13.1

WILLIAM W. DYER, Jr., *Primary Examiner.*

G. A. DOST, *Assistant Examiner.*